(12) United States Patent
Ptasinski et al.

(10) Patent No.: US 7,249,859 B1
(45) Date of Patent: Jul. 31, 2007

(54) CORNER CUBE CHEMICAL-BIOLOGICAL AGENT SENSOR

(75) Inventors: Joanna Ptasinski, San Diego, CA (US); Randy L. Shimabukuro, San Diego, CA (US); Stephen D. Russell, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/750,626

(22) Filed: Dec. 18, 2003

(51) Int. Cl.
*G02B 5/122* (2006.01)
(52) U.S. Cl. .................................................. 359/529
(58) Field of Classification Search ............... 359/529, 359/530
See application file for complete search history.

(56) References Cited

U.S. PATENT DOCUMENTS 6,137,623 A * 10/2000 Roberson et al. ........... 359/291

OTHER PUBLICATIONS

Marija S. Scholl, Optical Society of America, Ray trace through a corner-cube retroreflector with complex a reflection coefficients, Jul. 1995, vol. 12, No. 7, Mexico.

Zhiyu Hu, et al. American Institute of Physics, Investigation of Adsorption and absorption-induced stresses using Microcantilever sensors, Jul. 2001, vol. 90 No. 1, TN.
J. Fritz, et al. Sciencemag.org, Translating Biomolecular Recognition into Nanomechanics, Apr. 2000, vol. 288, Switzerland.
Patrick B Chu, et al. Optical Communication Using Micro Corner Cube Reflectors, 1997, IEEE, University of California at Berkey, CA.
Cattrall, Robert W., Optical Sensors, Latrobe University, Melbourne Australia.
Frank Zee, et al., "MEMS Chemical Gas Sensor", University/Government/Industry Microelectronics Symposium,1999. Proceedings of the 13th Biennial, vol./Iss. 1999, pp. 150-152. Los Angeles, CA.
Roberto Raiteri et al., Institute of Physical Chemistry, Mainz GE, Sensing of biological Substance based on the bending of microfabricated cantilevers, Elsevier Science B.V. 1999 PII: S0925-4005(99)00260-9.

* cited by examiner

*Primary Examiner*—Euncha P. Cherry
(74) *Attorney, Agent, or Firm*—Peter A. Lipovsky; Michael A. Kagan; Allan Y. Lee

(57) ABSTRACT

A sensing system comprises a corner-cube reflector that has three reflective surfaces wherein at least one of the reflective surfaces is a surface of a bimaterial cantilever. The reflective surface of the bimaterial cantilever undergoes a change between a substantially planar shape and a curved shape upon direct exposure to an agent of interest. Such a change is perceived by a suitable detector.

9 Claims, 2 Drawing Sheets

FIG.1
_PRIOR ART_
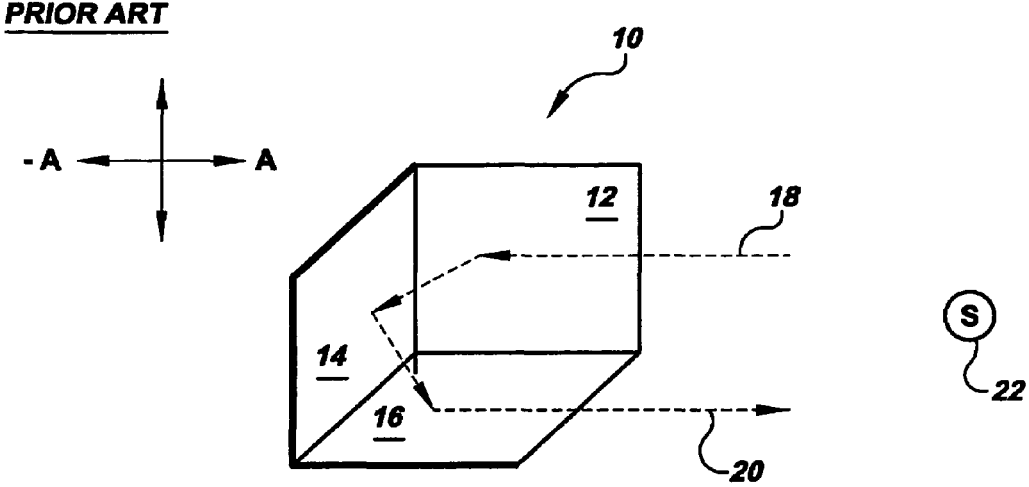

CORNER CUBE CHEMICAL-BIOLOGICAL AGENT SENSOR

BACKGROUND

The ensuing description relates generally to sensing systems for detecting environmental conditions.

SUMMARY

A sensing system comprises a corner-cube reflector that has three reflective surfaces wherein at least one of the reflective surfaces is a surface of a bimaterial cantilever. The reflective surface of the bimaterial cantilever undergoes a change between a substantially planar shape and a curved shape upon direct exposure to an agent of interest. Such a change is perceived by a suitable detector.

Other objects, advantages and new features will become apparent from the following detailed description when considered in conjunction with the accompanied drawings.

BRIEF DESCRIPTION OF THE DRAWINGS

FIG. 1 illustrates a prior art corner cube reflector.

DESCRIPTION

Figure 2:
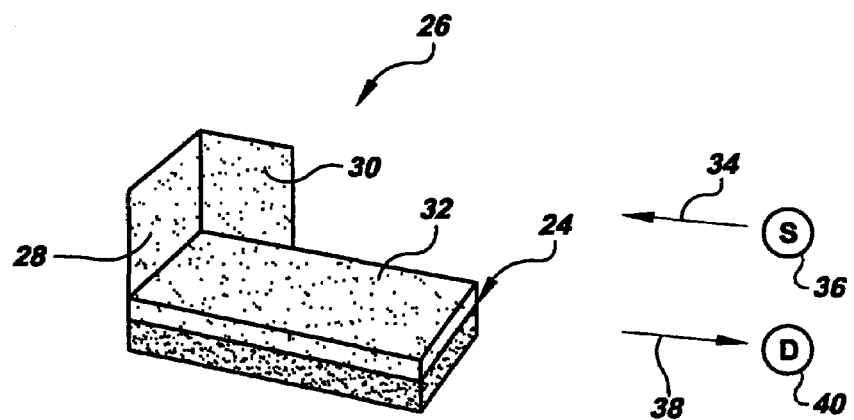
FIG. 2 is a representative view of a sensor according to the description herein.

Referring to FIG. 1, a prior art corner cube reflector 10 is illustrated. Reflector 10 is shown to include three planar reflective surfaces 12, 14 and 16 that in this figure are arranged to be mutually orthogonal and that cumulatively form a right-angle concave mirror.

Such corner cube reflectors may, for example, be fabricated via the emerging technology known as MEMS (Micro Electro Mechanical Systems). The term MEMS broadly encompasses many different kinds of devices fabricated on the micron scale, such as sensors, actuators, and instruments. These devices are usually fabricated with integrated circuit technology on a silicon substrate. Such MEMS technology allows the fabrication of microsensors that are very small in size and that are easily transitioned into standard Integrated Circuit (IC) technology facilities manufacturing.

Referring again to FIG. 1, it is well-known that a light ray 18 incident upon the corner cube reflector from direction A will result in a reflected-back ray 20 from direction—A, i.e. toward light source 22. This is the case when the light reflects off the three plano-reflective surfaces of the corner cube reflector. See for example, Scholl, "Ray Trace Through a Corner-Cube Reflector With Complex Reflection Coefficients", Journal of the Optical Society of America A, Vol. 12, No. 7, pp. 1589–1592 (1995).

Microcantilevers, such as those used in atomic force microscopy, are known to undergo bending due to forces involved in molecular adsorption. Adsorption induced forces can be so large that on a clean surface they can rearrange the lattice locations of surface and subsurface atoms, producing surface reconstructions and relaxations. An analogous transduction process is found in biology, where the interaction of membrane molecules modifies the lateral tension of a lipid bilayer. The resulting curvature of the membrane is responsible for mechanically triggering membrane protein function. See Zhiyu Hu, T. Thundat, and R. J. Warmack from Oak Ridge National Laboratory reported their "Investigation of adsorption and absorption-induced stresses using microcantilever sensors" in Journal of Applied Physics, Vol 90, Number 1. See also J. Fritz, M K Baller and H P Lang titled "Translating biomolecular recognition into nanomechanics", Science; Volume 288, Issue 5464, Pg. 316–318.

Specialized coatings, such as polymer coatings, may be added to the microcantilevers to react to specific agents of interest. Such coatings permit selected chemical/biological adsorption or absorption to take place at the cantilever. See the references by J. Fritz, M K Baller and H P Lang titled "Translating biomolecular recognition into nanomechanics", Science; Volume 288, Issue 5464, Pg. 316–318.

Referring now to FIG. 2, a bimaterial cantilever 24 is made part of a corner cube reflector 26 having reflective surfaces 28, 30 and 32. Reflector 26 as shown in FIG. 2 is identified herein as being in a first sensing condition characterized by reflective surface 32 of bimaterial cantilever 24 being substantially planar. When reflective surface 32 is substantially planar, the three reflecting surfaces 28, 30 and 32 of the reflector are mutually orthogonal as shown. Though reflector 26 is illustrated to include a single bimaterial cantilever, two or three such cantilevers may be used. Electromagnetic radiation 34, such as thermal, infrared, light or other, is projected from source 36 and is received in a first electromagnetic radiation state 38 by a detector 40. The first state of the electromagnetic radiation corresponds to reflected radiation when reflector 26 is in the first sensing condition as described above and as shown in FIG. 2.

Cantilever 24 may be comprised of a variety of material, examples of which can be found, for example, in the atomic force microscopy field. This field is known to employ cantilevers having a base of Si or Si3N4 and a thin reflective surface of either gold or palladium.

Figure 3:
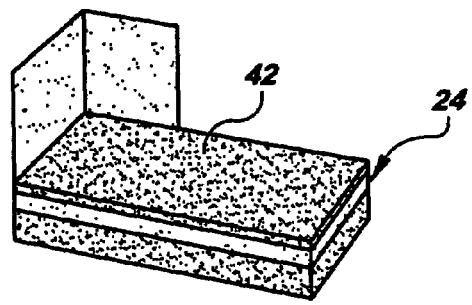
FIG. 3 is a representative view of another sensor according to the description herein.

Referring now to FIG. 3, another embodiment is shown wherein an agent sensitive coating 42 is suitably disposed on bimaterial cantilever 24. When positioned as shown in FIG. 3, such a coating is selected to be thin enough (suitable transparent) so that the reflectivity of the underlying material is not obstructed or is selected to be reflective itself. Such a coating, for example a polymer coating, is chosen to selectively bond to an agent of interest, such as a chemical or biological species.

Figure 4:
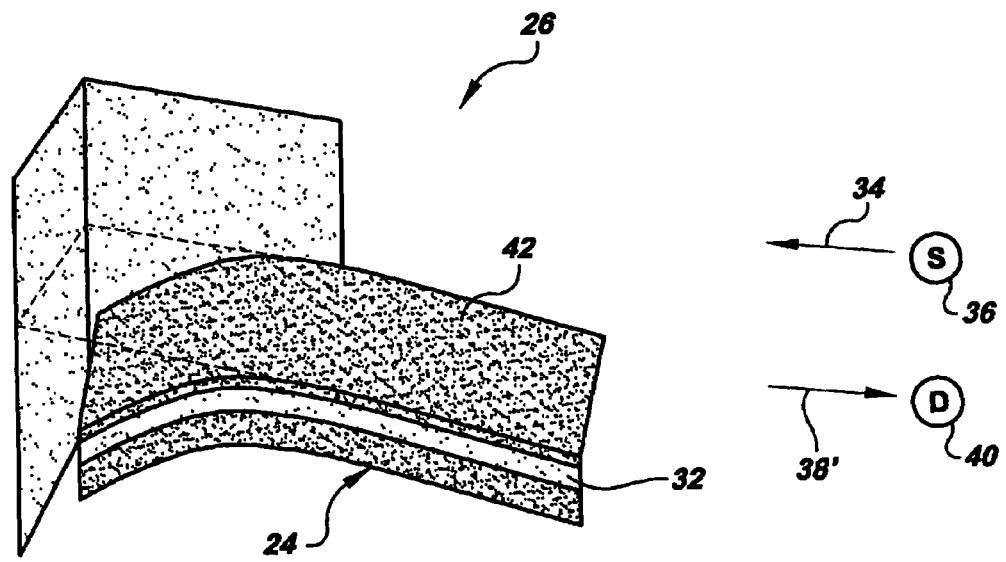
FIG. 4 depicts a utilization of a sensor according to the description herein.

Referring now to FIG. 4, a second sensing condition of reflector 26 is shown wherein bimaterial cantilever 24 has deflected as a function of molecular interactions. The cantilever transforms from a substantially planar shape, as shown in FIG. 2, to a curved shape upon encountering an agent of interest. Reflective surface 32 will likewise undertake this curved shape as well as any agent sensitive coating 42 placed upon the reflective surface, whether the coating itself is also reflective or is transparent as indicated above. When cantilever 24 deflects, it disrupts the alignment of the corner cube reflector. Electromagnetic energy 34 from source 36 takes on a second state 38' upon being reflected from the reflector in the condition shown and is then received at detector 40. In this process, the second sate of the electromagnetic energy (38') has experienced a shift from the first state of the electromagnetic energy (38) as received at detector 40. The change in the received electromagnetic energy, due to the deflection of cantilever 24, may be measured at detector 40 in terms of intensity, angular direction or phase change, and is equated with a change in the presence of an agent of interest, such as a chemical or biological agent species.

In the figures, for simplicity, the associated substrate on which the cantilever is formed is not shown. This substrate, however, may contain control circuitry, alternate sensors, etc. as desired for specific applications.

The method of fabricating the corner cube chemical-biological agent sensor is analogous to the steps carried out in prior art MEMS corner cube fabrication, with the exception that one or more bimaterial cantilevers are used and that an optional agent sensitive coating is formed on the cantilever or cantilevers. It is suitable to form the coating prior to the assembly of the corner cube. Piezoelectric transducers, as practiced in the art, could be integrated to self-assemble the corner cube reflector.

The sensor described herein is miniaturizable, allows remote (non-contact) read-out, requires no electrical bias (power), and is immune to electromagnetic interference.

Though a sensor employing a corner cube retroreflector has been described, the concept of utilizing a bimaterial cantilever is considered extendable to other retroreflectors, such as a penta-prism.

Obviously, many modifications and variations are possible in light of the above description. It is therefore to be understood that within the scope of the claims the invention may be practiced otherwise than as has been specifically described.

What is claimed is:

1. A corner-cube reflector having three reflective surfaces comprising:
    at least one of said reflective surfaces being a surface of a bimaterial cantilever that changes between a substantially planar shape and a curved shape upon exposure to an agent of interest wherein an agent sensitive coating is disposed on a surface of said bimaterial cantilever, said agent sensitive coating being substantially transparent to electromagnetic radiation.

2. The apparatus of claim 1 wherein said bimaterial cantilever is chosen from the bimaterial group of Au—Si, Pd—Si, Au—Si3N4, and Pd—Si3N4.

3. The apparatus of claim 1 wherein said agent sensitive coating selectively bonds to a chemical or biological species and wherein said bimaterial cantilever changes between said substantially planar shape and said curved shape upon said agent sensitive coating being exposed to said chemical or biological species.

4. A corner-cube reflector having three reflective surfaces comprising:
    at least one of said reflective surfaces being a surface of a bimaterial cantilever; and
    an agent sensitive coating disposed on said surface of said bimaterial cantilever to selectively bond to an agent of interest, wherein said bimaterial cantilever changes between a substantially planar shape and a curved shape upon exposure to said agent of interest.

5. The apparatus of claim 4 wherein said agent of interest is a chemical or biological species.

6. The apparatus of claim 5 wherein said agent sensitive coating is substantially transparent to electromagnetic radiation.

7. The apparatus of claim 5 wherein said agent sensitive coating is substantially reflective to electromagnetic radiation.

8. The apparatus of claim 6 wherein said bimaterial cantilever is chosen from the bimaterial group of Au—Si, Pd—Si, Au—Si3N4, and Pd—Si3N4.

9. The apparatus of claim 7 wherein said bimaterial cantilever is chosen from the bimaterial group of Au—Si, Pd—Si, Au—Si3N4, and Pd—Si3N4.

* * * * *